(12) United States Patent
Ichioka

(10) Patent No.: US 11,100,377 B2
(45) Date of Patent: Aug. 24, 2021

(54) IMAGE RECORDING APPARATUS, IMAGE RECORDING METHOD, AND CORRECTION INFORMATION ACQUISITION METHOD

(71) Applicant: SCREEN HOLDINGS CO., LTD., Kyoto (JP)

(72) Inventor: Yoshikazu Ichioka, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 16/616,820

(22) PCT Filed: Apr. 26, 2018

(86) PCT No.: PCT/JP2018/017063
§ 371 (c)(1),
(2) Date: Nov. 25, 2019

(87) PCT Pub. No.: WO2018/221101
PCT Pub. Date: Dec. 6, 2018

(65) Prior Publication Data
US 2020/0410307 A1    Dec. 31, 2020

(30) Foreign Application Priority Data

May 31, 2017   (JP) .............................. JP2017-108421

(51) Int. Cl.
*G06K 15/02*    (2006.01)
*G06K 15/10*    (2006.01)
(Continued)

(52) U.S. Cl.
CPC .......... *G06K 15/027* (2013.01); *B41J 2/2132* (2013.01); *G06K 15/102* (2013.01); *G06K 15/1878* (2013.01); *G06K 15/408* (2013.01)

(58) Field of Classification Search
CPC ............... G06K 15/027; G06K 15/102; G06K 15/1878; G06K 15/408; B41J 2/2132
See application file for complete search history.

(56) References Cited

U.S. PATENT DOCUMENTS

2007/0242098 A1    10/2007  Sudo et al.
2008/0036803 A1    2/2008   Yun
(Continued)

FOREIGN PATENT DOCUMENTS

JP    2007-283544 A    11/2007
JP    2012-006386 A     1/2012
(Continued)

OTHER PUBLICATIONS

International Search Report issued in corresponding International Patent Application No. PCT/JP2018/17063, dated Jun. 19, 2018, with English translation.

(Continued)

*Primary Examiner* — Quang N Vo
(74) *Attorney, Agent, or Firm* — McDermott Will & Emery LLP

(57) ABSTRACT

In an image recording apparatus, when an image is recorded on a recording medium, the recording medium passes through a head part only once. Before the image is recorded, a value of a color component of at least some of pixels included in the image is corrected in order to reduce color mixing unevenness. At that time, on the basis of respective values of two reference color components among a plurality of color components of a correction target pixel, a value of one target color component included among the two reference color components is corrected. Alternatively, on the basis of respective values of three reference color components among the plurality of color components, a value of one target color component or respective values of two (Continued)

target color components included among the three reference color components are corrected.

12 Claims, 9 Drawing Sheets

(51) Int. Cl.
 *G06K 15/00* (2006.01)
 *B41J 2/21* (2006.01)

(56) References Cited

U.S. PATENT DOCUMENTS

| | | |
|---|---|---|
| 2011/0285780 A1 | 11/2011 | Yamada et al. |
| 2012/0242729 A1 | 9/2012 | Takahashi et al. |
| 2014/0240387 A1 | 8/2014 | Ishida |
| 2015/0373228 A1* | 12/2015 | Ukishima ............. G06F 3/1219 358/3.24 |
| 2018/0257393 A1* | 9/2018 | Sato ....................... B41J 25/003 |

FOREIGN PATENT DOCUMENTS

| | | |
|---|---|---|
| JP | 2012-200920 A | 10/2012 |
| JP | 2013-141799 A | 7/2013 |
| JP | 2015-066744 A | 4/2015 |
| JP | 2016-190427 A | 11/2016 |
| JP | 2017-043029 A | 3/2017 |

OTHER PUBLICATIONS

Notification Concerning Transmittal of International Preliminary Report on Patentability issued in corresponding International Patent Application No. PCT/JP2018/017063, dated Dec. 12, 2019, with English translation.

Notification of Transmittal of Translation of the International Preliminary Report on Patentability issued in corresponding International Patent Application No. PCT/JP2018/017063, dated Dec. 12, 2019, with English translation.

Extended European Search Report issued in corresponding European Patent Application No. 18809933.7-1209, dated Feb. 2, 2021.

* cited by examiner

IMAGE RECORDING APPARATUS, IMAGE RECORDING METHOD, AND CORRECTION INFORMATION ACQUISITION METHOD

CROSS REFERENCE TO RELATED APPLICATIONS

This application is the U.S. National Phase under 35 U.S.C. § 371 of International Application No. PCT/JP2018/17063, filed on Apr. 26, 2018, which claims the benefit of Japanese Application No. 2017-108421, filed on May 31, 2017, the entire contents of each are hereby incorporated by reference.

TECHNICAL FIELD

The present invention relates to a technology for recording an image on a recording medium by ejecting droplets of ink toward a recording medium.

BACKGROUND ART

Conventionally, an image recording apparatus which records an image on a recording medium by ink jet method through relative movement of an ejection part which ejects fine droplets of ink from a plurality of ejection ports, with respect to the recording medium, has been used. In the image recording apparatus, in some cases, variation in the amount of ink ejected from a plurality of nozzles or in the spattering direction of droplets is caused due to the processing accuracy of the nozzles, the mounting accuracy of the ejection part, or the like, and as a result, there occurs density unevenness, stripe moire, or the like (hereinafter, referred to simply as "density unevenness") on the recording medium.

In a so-called "one-pass type" image recording apparatus in which a head part passes over a recording medium only once in image recording, particularly, it is more difficult to correct the density unevenness, as compared with a so-called "multipass type" image recording apparatus in which a head part passes over a recording medium a plurality of times. Further, in a case of using the one-pass type image recording apparatus, since a plurality of ejection units are so provided in the head part as to cross the recording medium, there is a tendency that unevenness occurs at each connection part between the ejection units. In order to suppress such density unevenness, conventionally, correction of the density unevenness for each color component is performed. For example, a predetermined chart for each color component is recorded on the recording medium and the density of the chart is acquired by using a line camera or the like. On the basis of the acquired density, density correction (also referred to as "shading") of an original image is performed for each color component.

Even if the density unevenness in the record of one color component is corrected, however, there occurs unevenness in an area in which two color components overlap each other in some cases. There is a case, for example, where no unevenness is observed in image recording of single color having a cyan density of 90% (hereinafter, represented as "90% cyan") and unevenness is observed in image recording of 90% cyan and 90% magenta. Then, for example, Japanese Patent Application Laid-Open No. 2012-6386 (hereinafter, referred to as "Document 1") discloses a method of separately obtaining the amount of correction for a mixed color of two or more colors and correcting the original image.

In a case where respective correction values are obtained for various mixed colors, like in Document 1, in order to record a chart for obtaining the correction value on the recording medium, charts for a large number of color component combinations are needed. As a result, a lot of recording media such as paper, a film, or the like and ink are consumed and environmental load increases, and the operation for obtaining the correction value requires time. Further, since the behavior of the droplets after reaching the recording medium is changed when the type of the recording medium is changed, it is necessary to obtain a correction value for each type of recording medium.

Moreover, in Document 1, since RGB values are conversed into CMYK values after correction values are obtained on an RGB space, it is inevitable that the accuracy is reduced due to an error in the conversion from the three-dimensional space into the four-dimensional space. In a case where correction values are directly obtained in the four-dimensional space, an enormous number of charts are needed in the method disclosed in Document 1. In the method of Document 1, when correction values are obtained at five-level densities for each of three color components, the number of charts is 44. When correction values are obtained at five-level densities for each of four color components, the number of charts is 112.

In order to increase the accuracy of correction, for example, when correction values are obtained at ten-level densities for each of three color components, the number of charts is 104, and when correction values are obtained at ten-level densities for each of four color components, the number of charts is 272. In general, when correction values are obtained at m-level densities for each of n color components where both m and n are integers of 2 or more, the number of charts is $m \times 2^{(n-1)} + ((m-2) \times 2^{(n-1)}) \times (n-1)$.

SUMMARY OF INVENTION

The present invention is intended for an image recording apparatus for recording an image on a recording medium. The image recording apparatus according to one preferred embodiment of the present invention includes a head part for ejecting droplets of ink toward a recording medium, a moving mechanism for moving the recording medium relative to the head part in a moving direction, an output control part for controlling ejection of ink from the head part in synchronization with relative movement of the recording medium, and a correction part for correcting values of a color component of at least some of pixels included in the image. The head part includes a plurality of ink ejection parts for ejecting droplets of inks having color components different from one another. The plurality of ink ejection parts are arranged in the moving direction. Each ink ejection part includes a plurality of ejection ports arranged across a recording range on the recording medium with respect to a width direction perpendicular to the moving direction. The recording medium passes through the head part only once when an image is recorded on the recording medium. The correction part corrects a value of one target color component included among two reference color components among a plurality of color components of a correction target pixel on the basis of respective values of the two reference color components, or corrects a value of one target color component or respective values of two target color components included among three reference color components among the plurality of color components on the basis of respective values of the three reference color components.

By the present invention, it is possible to easily correct unevenness which occurs when a plurality of color components overlap one another.

Preferably, the correction part determines the two reference color components or the three reference color components on the basis of respective values of the plurality of color components of the correction target pixel.

More preferably, the correction part acquires a color component having a value larger than a predetermined value out of the respective values of the plurality of color components of the correction target pixel and determines the two reference color components or the three reference color components on the basis of the acquired color component.

In one preferred example, the correction part determines the two reference color components from the respective values of the plurality of color components of the correction target pixel, the two reference color components are cyan and magenta, and the target color component is cyan.

In another preferred example, the two reference color components or the three reference color components include black and black is a target color component.

In still another preferred example, a color component whose droplet is first ejected toward the recording medium, among the two reference color components or the three reference color components, is the target color component.

Preferably, the number of the plurality of color components is four or more.

In a preferred embodiment of the present invention, in order to acquire information required for correction, the image recording apparatus records a chart on a recording medium by the control of the output control part, and the chart includes a plurality of recording areas in which a value of at least one target color component is slightly changed in a plurality of ways within a predetermined range in a width direction, with respect to each of a plurality of value combinations of a plurality of reference color components.

Preferably, the each ink ejection part includes a plurality of ejection units arranged in the width direction. Respective end portions of ejection port rows of adjacent ejection units in the width direction overlap each other in the moving direction. Pixels corresponding to both ends of a range in the width direction, the range in which the ejection port rows overlap each other, are included among targets of correction to be performed by the correction part.

The present invention is also intended for an image recording method of recording an image on a recording medium. The image recording method includes a) correcting values of a color component of at least some of pixels included in an image and b) recording the image on the recording medium by moving the recording medium relative to a head part in a moving direction while ejecting droplets of ink toward the recording medium from the head part on the basis of the image. The head part includes a plurality of ink ejection parts for ejecting droplets of inks having color components different from one another. The plurality of ink ejection parts are arranged in the moving direction. Each ink ejection part includes a plurality of ejection ports arranged across a recording range on the recording medium with respect to a width direction perpendicular to the moving direction. The recording medium passes through the head part only once when an image is recorded on the recording medium. A value of one target color component included among two reference color components among a plurality of color components of a correction target pixel is corrected on the basis of respective values of the two reference color components, or a value of one target color component or respective values of two target color components included among three reference color components among the plurality of color components are corrected on the basis of respective values of the three reference color components in the operation a).

Preferably, the image recording method further includes, before the operation a), c) recording a chart on a recording medium by using the head part, the chart including a plurality of recording areas in which a value of at least one target color component is slightly changed in a plurality of ways within a predetermined range in a width direction, with respect to each of a plurality of value combinations of a plurality of reference color components, and d) determining a relation between respective values of the plurality of reference color components and a correction value of the at least one target color component with reference to the chart.

The present invention is still also intended for a correction information acquisition method in an image recording method including a) correcting values of a color component of at least some of pixels included in an image and b) recording the image on a recording medium by moving the recording medium relative to a head part in a moving direction while ejecting droplets of ink toward the recording medium from the head part on the basis of the image. In the image recording method, the head part includes a plurality of ink ejection parts for ejecting droplets of inks having color components different from one another. The plurality of ink ejection parts are arranged in the moving direction. Each ink ejection part includes a plurality of ejection ports arranged across a recording range on the recording medium with respect to a width direction perpendicular to the moving direction. The recording medium passes through the head part only once when the image is recorded on the recording medium. A value of one target color component included among two reference color components among a plurality of color components of a correction target pixel is corrected on the basis of respective values of the two reference color components, or a value of one target color component or respective values of two target color components included among three reference color components among the plurality of color components are corrected on the basis of respective values of the three reference color components in the operation a). The correction information acquisition method is a method of acquiring correction information which is referred to in the above-described operation a). The correction information acquisition method includes c) recording a chart on a recording medium by using the head part, the chart including a plurality of recording areas in which a value of at least one target color component is slightly changed in a plurality of ways within a predetermined range in a width direction, with respect to each of a plurality of value combinations of a plurality of reference color components, and d) determining correction information indicating a relation between respective values of the plurality of reference color components and a correction value of the at least one target color component with reference to the chart.

By the present invention, it is possible to easily acquire information required for correction.

These and other objects, features, aspects and advantages of the present invention will become more apparent from the following detailed description of the present invention when taken in conjunction with the accompanying drawings.

DESCRIPTION OF EMBODIMENTS

Figure 1:
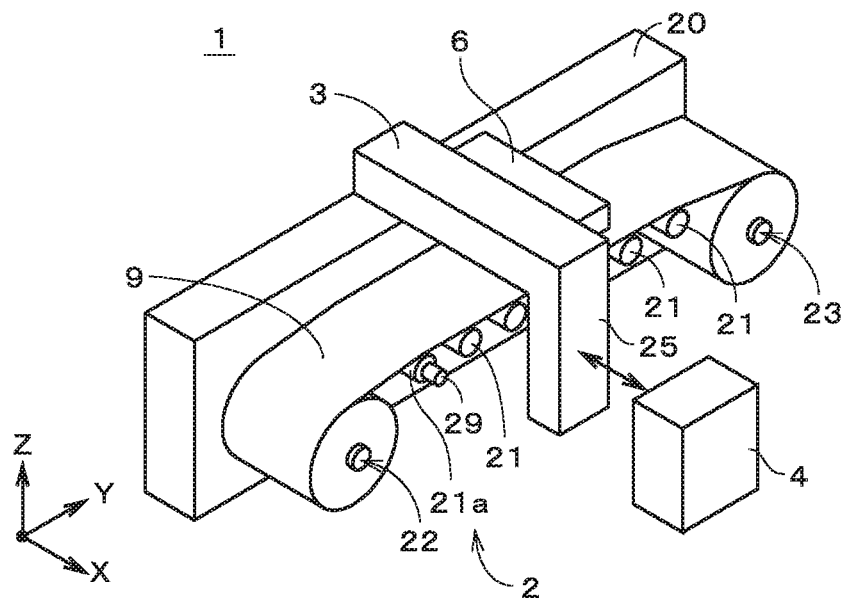
FIG. 1 is a perspective view showing a configuration of an image recording apparatus.

FIG. 1 is a perspective view showing a configuration of an image recording apparatus 1 in accordance with one preferred embodiment of the present invention. The image recording apparatus 1 is a printer (a so-called ink jet printer) which records a color image on a long sheet-like recording medium 9 by ejecting fine droplets of ink on the recording medium 9. The recording medium 9 is, for example, printing paper.

In FIG. 1, two horizontal directions perpendicular to each other are represented as an X direction and a Y direction, and a vertical direction perpendicular to the X direction and the Y direction is represented as a Z direction. The X direction and the Y direction in FIG. 1 are not necessarily needed to be in the horizontal direction, and similarly the Z direction is also not necessarily needed to be in the vertical direction. In other words, the upper side and the lower side in FIG. 1 are not necessarily needed to coincide with the upper side and the lower side in the direction of gravity.

As shown in FIG. 1, the image recording apparatus 1 includes a moving mechanism 2, a head part 3, a control unit 4, and an image pickup part 6. The moving mechanism 2 moves the recording medium 9 in a predetermined moving direction. In the exemplary case shown in FIG. 1, the moving direction of the recording medium 9 is the Y direction, and the recording medium 9 is moved from the (−Y) side to the (+Y) side. The recording medium 9 is a long sheet-like medium which is long in the Y direction that is the moving direction. The head part 3 and the image pickup part 6 are fixed to a frame 25 provided across the moving mechanism 2. The head part 3 and the image pickup part 6 are positioned on the upper side (i.e., the (+Z) side) of the moving mechanism 2. The frame 25 is attached to a base 20. The head part 3 ejects droplets of ink toward the recording medium 9 being transferred by the moving mechanism 2. The image pickup part 6 is disposed on the (+Y) side of the head part 3, and picks up an image recorded on the recording medium 9 by the head part 3. The control unit 4 controls the moving mechanism 2, the head part 3, and the image pickup part 6.

In the moving mechanism 2, a plurality of rollers 21 each of which is long in the X direction in FIG. 1 are arranged in the Y direction. The X direction is a width direction of the recording medium 9. On the (−Y) side of the plurality of rollers 21, provided is a feeding part 22 for holding a roll-like recording medium 9 (feed roll) and on the (+Y) side of the plurality of rollers 21, provided is a winding part 23 for holding a roll-like recording medium 9 (wind-up roll). The recording medium 9 has a roll-like shape on each of the feeding part 22 and the winding part 23. In the following description, simple description of the recording medium 9 refers to the recording medium 9 being transferred (i.e., the recording medium 9 on the plurality of rollers 21).

On one roller 21a of the moving mechanism 2, provided is an encoder 29 for detecting a movement speed of the recording medium 9 in the moving direction. When the control unit 4 controls rotation of a motor of the winding part 23 on the basis of an output from the encoder 29, the recording medium 9 is transferred in the (+Y) direction at a constant speed. The recording medium 9 is transferred in the moving direction, with tension applied thereto from both sides of the moving direction, by the moving mechanism 2. Specifically, for example, the recording medium 9 is given a load (tension) in a direction opposite to the front side of the moving direction (i.e., in the (−Y) direction) by a motor included in the feeding part 22. The recording medium 9 on the plurality of rollers 21 is thereby moved smoothly without any heave.

Figure 2:
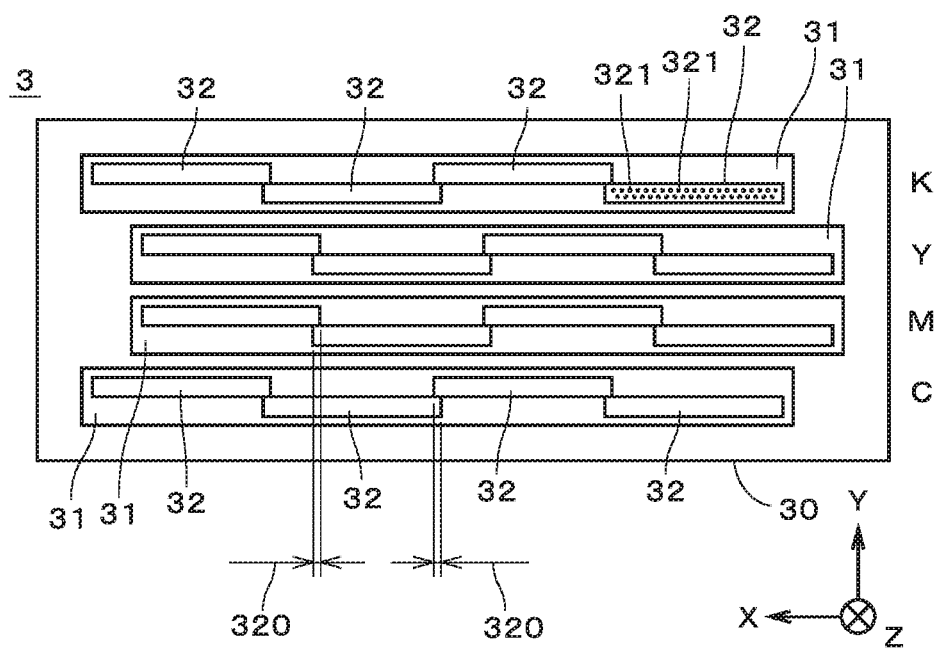
FIG. 2 is a bottom view showing a head part.

FIG. 2 is a bottom view showing the head part 3. The head part 3 includes a plurality of ink ejection parts 31 having the same structure. The plurality of ink ejection parts 31 eject droplets of inks having color components different from one another, respectively, toward the recording medium 9. The plurality of ink ejection parts 31 are arranged in the Y direction (i.e., in the moving direction) and mounted on a mount part 30 of the head part 3. In the exemplary case shown in FIG. 2, four ink ejection parts 31 are mounted on the head part 3. Each of the ink ejection parts 31 includes a plurality of ejection ports 321 arranged across a recording range on the recording medium 9 with respect to the width direction perpendicular to the moving direction. Though the ejection ports 321 are shown only in upper-right one of ejection units 32 described later in FIG. 2, actually, a large number of ejection ports 321 are densely provided in each of the ejection units 32.

The ink ejection part 31 on the most (−Y) side in FIG. 2 ejects ink having a color component of cyan (C). The ink ejection part 31 on the (+Y) side of the ink ejection part 31 for cyan ejects ink having a color component of magenta (M). The ink ejection part 31 on the (+Y) side of the ink ejection part 31 for magenta ejects ink having a color component of yellow (Y). The ink ejection part 31 on the most (+Y) side ejects ink having a color component of black (K). In FIG. 2, on the right side of the ink ejection parts 31, reference signs "C", "M", "Y", and "K" are given.

Each of the ink ejection parts 31 includes a plurality of ejection units 32. The plurality of ejection units 32 are arranged in a staggered manner along a predetermined direction crossing the above-described moving direction. In the exemplary case shown in FIG. 2, in each ink ejection part 31, four ejection units 32 are arranged along the width direction (i.e., the X direction) perpendicular to the moving direction of the recording medium 9. In each of the ejection units 32, provided are a plurality of ejection ports 321 arranged along the width direction. Further, the plurality of ejection ports 321 are not necessarily needed to be arranged along the width direction, but have only to be arranged along a direction crossing the moving direction.

In the image recording apparatus 1 shown in FIG. 1, each ink ejection part 31 is provided across an entire recording area on the recording medium 9 with respect to the X direction (for example, across the entire recording medium 9 in the X direction). Further, the plurality of ejection ports 321 in each ink ejection part 31 are also provided across the full width of the recording area with respect to the X direction.

For example, the size of a droplet of ink ejected from each ejection port 321 in each ink ejection part 31 is changeable.

In other words, in each ink ejection part 31, the ejection ports 321 can eject different amounts of droplets of ink, respectively. When the size of the droplet of ink is changed and the droplet is landed on the recording medium 9, the size of a dot formed on the recording medium 9 is also changed. In other words, in the image recording apparatus 1, the dot whose size is changeable is recorded on the recording medium 9 by the head part 3.

In the image recording apparatus 1, an output control part 41 of the control unit 4 (see FIG. 4) controls the head part 3 and the moving mechanism 2 and controls ejection of ink from the head part 3 in synchronization with the relative movement of the recording medium 9. When the recording medium 9 passes positions facing the plurality of ink ejection parts 31 in the head part 3 only once in the (+Y) direction, inks of cyan, magenta, yellow, and black are sequentially ejected on the recording medium 9 and recording of the image on the recording medium 9 is completed.

Figure 3:
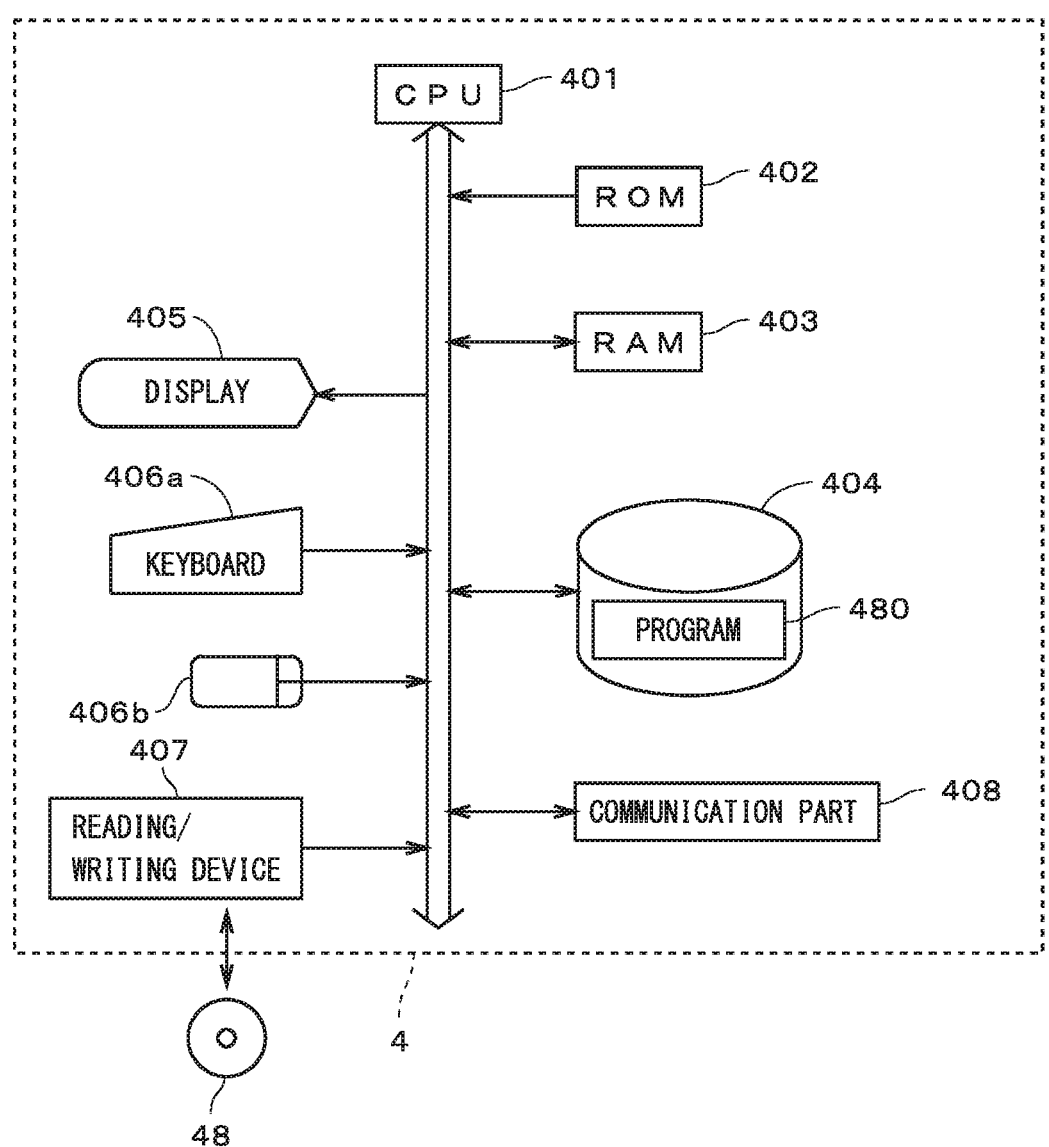
FIG. 3 is a view showing a constitution of a control unit.

FIG. 3 is a view showing a constitution of the control unit 4. The control unit 4 has a constitution of general computer system including a CPU 401 for performing various computations, a ROM 402 for storing therein a basic program and a RAM 403 for storing therein various information. The control unit 4 further includes a fixed disk 404 for storing therein information, a display 405 for displaying various information such as an image or the like, a keyboard 406a and a mouse 406b for receiving an input from an operator (hereinafter, the devices regarding an input operation are referred to generally as an "input part 406"), a reading/writing device 407 for reading information from a computer-readable storage medium 48 such as an optical disk, a magnetic disk, a magneto-optic disk, or the like and writing information into the storage medium 48, and a communication part 408 for transmitting and receiving a signal to/from other constituent elements or the like of the image recording apparatus 1.

In the control unit 4, a program 480 is read out from the storage medium 48 through the reading/writing device 407 and stored in the fixed disk 404 in advance. The CPU 401 performs a computation according to the program 480 while using the RAM 403 and/or the fixed disk 404. These functions of the control unit 4 may be implemented by dedicated electric circuits, or may be partially implemented by the dedicated electric circuits.

Figure 4:
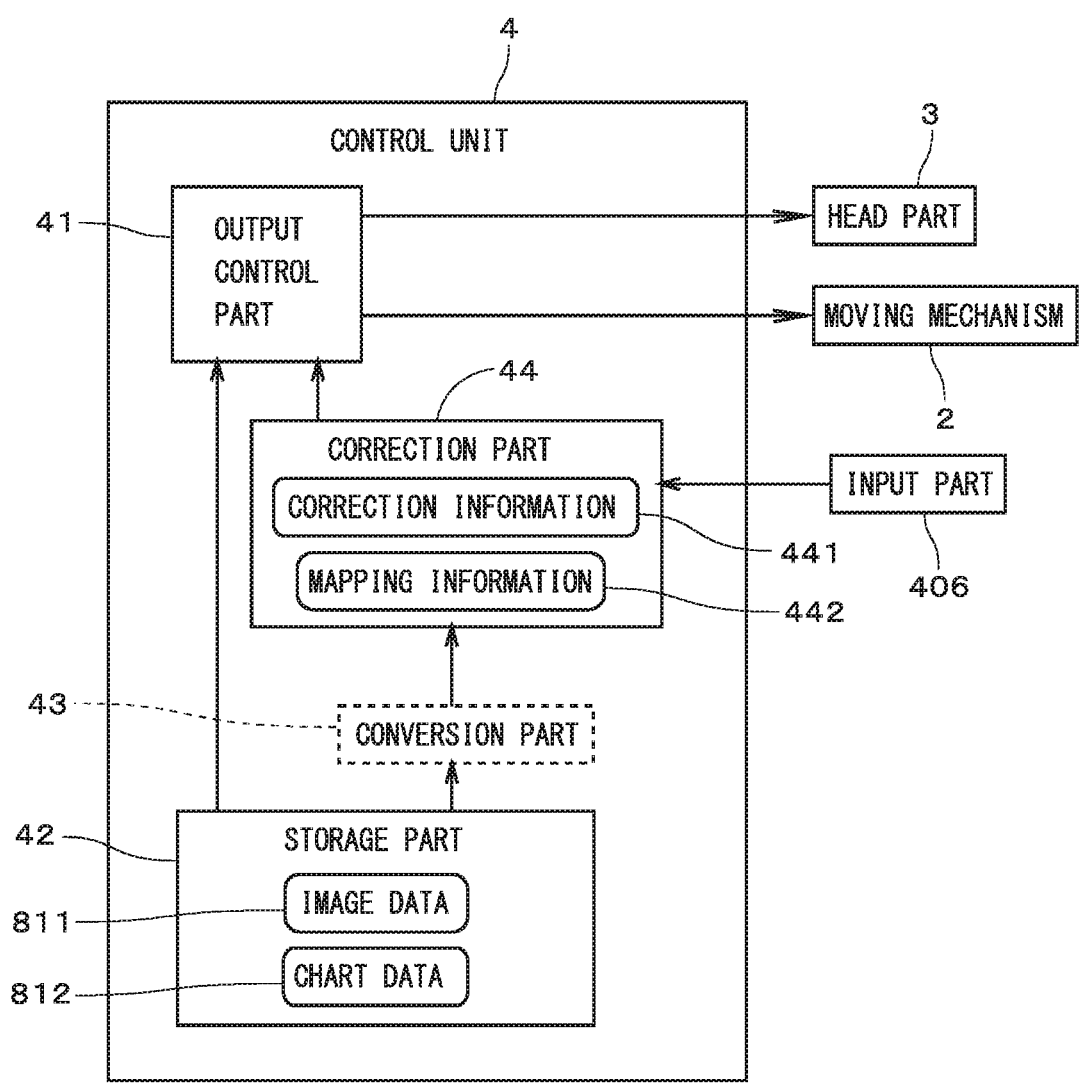
FIG. 4 is a block diagram showing functions of the control unit.

FIG. 4 is a block diagram showing the functions of the control unit 4. FIG. 4 also shows some of the constituent elements of the image recording apparatus 1, which are connected to the control unit 4. The control unit 4 includes the output control part 41, a storage part 42, a conversion part 43, and a correction part 44. The conversion part 43 is provided only when needed.

Into the storage part 42, stored are data 811 of an image to be recorded (hereinafter, referred to as "image data") and data 812 of a chart to be used for correction described later (hereinafter, referred to as "chart data"). When the image data 811 has an RGB format, the conversion part 43 converts the RGB format into a CMYK format. When the image data 811 has the CMYK format, the conversion part 43 is omitted. The chart data 812 has a CMYK format in principle. The correction part 44 corrects the image data 811 of CMYK format. Processing on the image (including the chart) in the following description is processing on the data of the image, to be exact. The correction part 44 corrects values of a color component of at least some of pixels included in the image. The output control part 41 controls the moving mechanism 2 and the head part 3 on the basis of the corrected image data 811, to thereby record the image on the recording medium 9. When the chart data 812 is inputted to the output control part 41, the chart is recorded on the recording medium 9.

In the correction part 44, correction information 441 and mapping information 442 are stored and prepared. As a characteristic feature of the correction performed in the image recording apparatus 1, in the image recording apparatus 1, on the basis of respective values of two reference color components among a plurality of color components of a correction target pixel, a value of one target color component included among the two reference color components is corrected, or on the basis of respective values of three reference color components among the plurality of color components, a value of one target color component or respective values of two target color components included among the three reference color components are corrected. In the present preferred embodiment, the number of the plurality of color components is four for CMYK, and on the basis of respective values of these four color components, two reference color components and one target color component of each pixel are determined with reference to the mapping information 442. Then, the correction part 44 refers to the correction information 441 and thereby acquires a correction value of the target color component, which is predetermined corresponding to respective values of the two reference color components.

Though a density value of 0 to 100% is used as a value of a color component in the following description, the density value may be a computational pixel value such as a tone value of 0 to 255. Specifically, the density value ranging from 0 to 100% is adopted only for explanatory convenience and any other equivalent value may be used.

Figure 5:
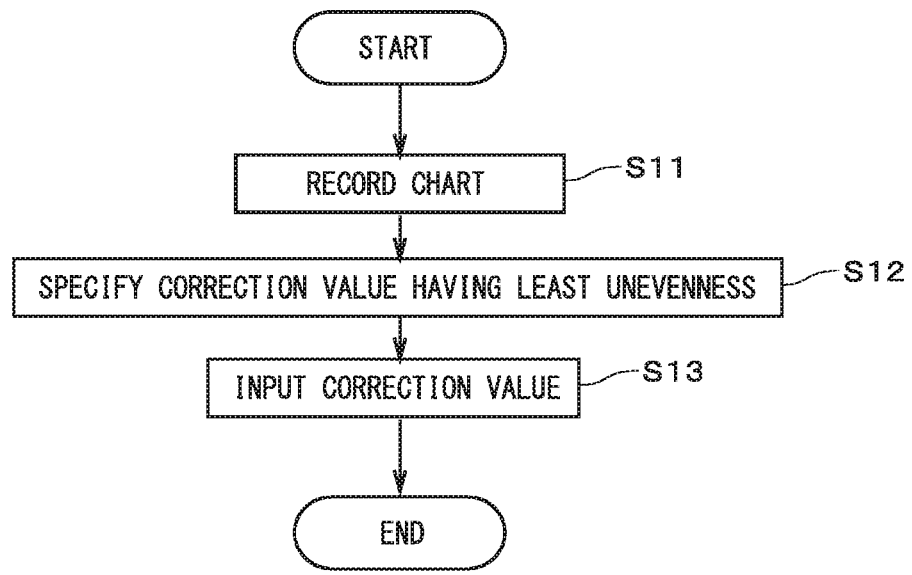
FIG. 5 is a flowchart showing a flow of acquisition of correction information.

FIG. 5 is a flowchart showing a flow of acquisition of the correction information 441. First, the chart data 812 is inputted to the output control part 41 not through the correction part 44, and the chart is recorded on the recording medium 9 (Step S11). It is assumed, however, that correction (so-called shading) of density unevenness for each color component as a single color is performed in advance and if a uniform image is recorded with each density of one color component, there is almost no density unevenness.

Figure 6:
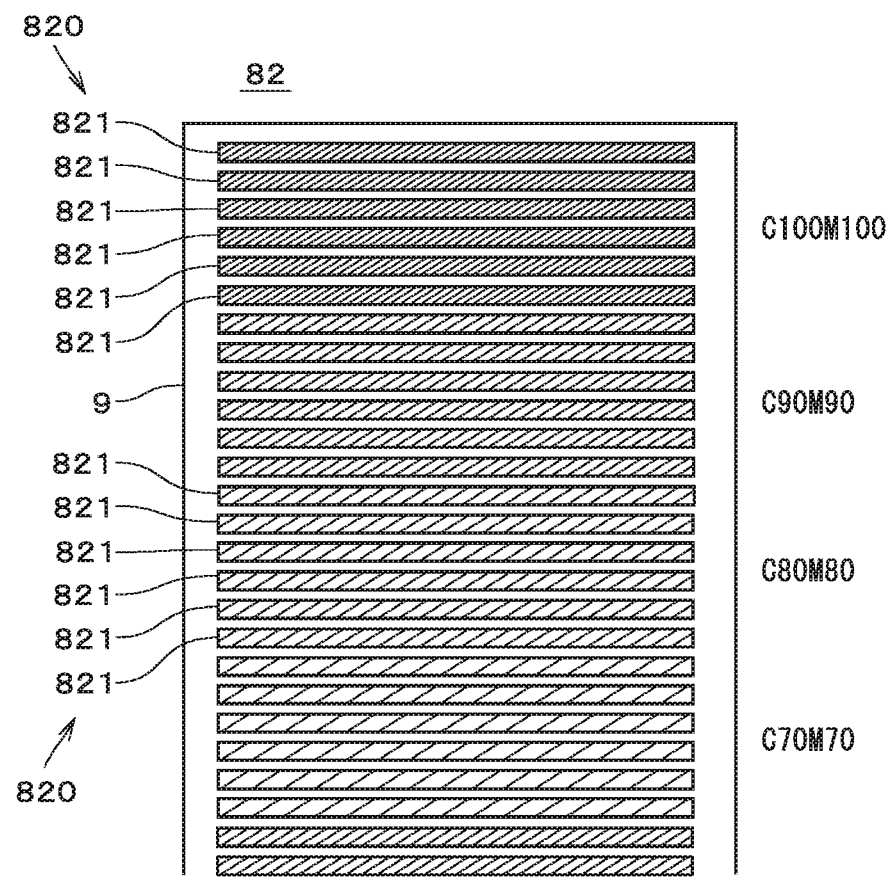
FIG. 6 is a view showing an exemplary chart.

FIG. 6 is a view showing an exemplary chart. A chart 82 exemplarily shows a case where cyan and magenta are reference color components and the target color component is cyan. It is predetermined in the mapping information 442 or the like that when cyan and magenta are reference color components, the target color component is cyan. The chart 82 includes a plurality of recording areas 821. Each of the recording areas 821 has a bar-like shape extending in the width direction perpendicular to the moving direction. Each recording area 821 is extended across the entire recording range on the recording medium 9 with respect to the width direction. The plurality of recording areas 821 are arranged in the moving direction.

In the exemplary case shown in FIG. 6, six recording areas 821 from the upper side correspond to 100% cyan and 100% magenta (hereinafter, represented as "C100M100"). In FIG. 6, beside the corresponding six recording areas 821, reference sign "C100M100" is given. From the upper-most recording area 821, the value of cyan is sequentially corrected by 0%, −2%, −4%, −6%, −8%, and −10% within a predetermined range inside the recording area 821 in the width direction. Specifically, from the upper-most recording area 821, only a predetermined partial area inside the recording area 821 sequentially becomes C100M100, C98M100, C96M100, C94M100, C92M100, and C90M100.

Hereinafter, a group of these recording areas 821 will be referred to as a "recording area group 820".

The next recording area group 820, i.e., the seventh to twelfth recording areas 821 from the upper side correspond to C90M90. From the seventh recording area 821 from the upper side, only a predetermined partial area inside the recording area 821 sequentially becomes C90M90, C88M90, C86M90, C84M90, C82M90, and C80M90. The next recording area group 820 corresponds to C80M80. From the thirteenth recording area 821 from the upper side, only a predetermined partial area inside the recording area 821 sequentially becomes C80M80, C78M80, C76M80, C74M80, C72M80, and C70M80. In the following description, a combination of values of the reference color components without any correction will be referred to as a "reference-value combination".

Figure 7:
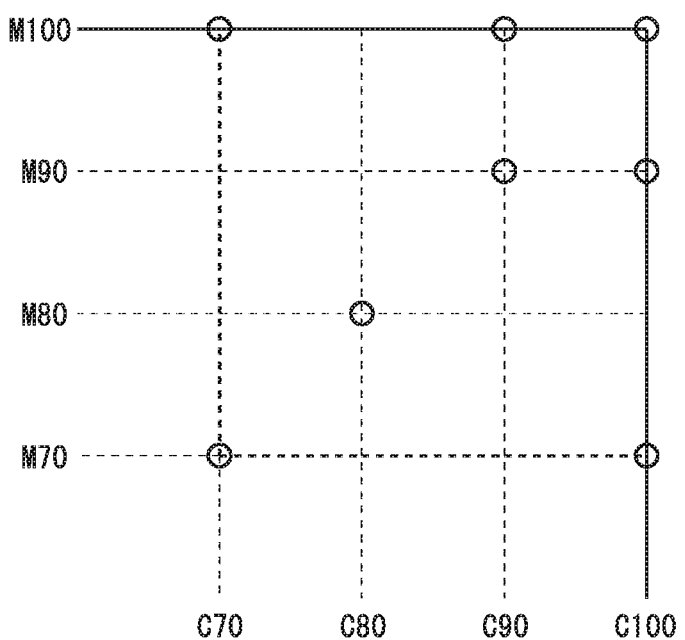
FIG. 7 is a view showing preferable combinations of values of reference color components.

FIG. 7 is a view showing preferable reference-value combinations. C100, C90, C80, and C70 each indicate a value of cyan and M100, M90, M80, and M70 each indicate a value of magenta at a lattice point. Since color mixing unevenness caused by an overlap between different color components becomes clearer as the density of the color components are higher, for the reference-value combination, a combination of larger values of the color components (i.e., higher density values) is adopted. Further, the reference-value combinations are so set as not to be unbalanced to a specified range. In FIG. 7, as indicated by blank circles (○), C100M100, C90M90, C80M80, C70M70, C100M90, C100M70, C90M100, and C70M100 are adopted as eight sets of reference-value combinations.

Figure 8:
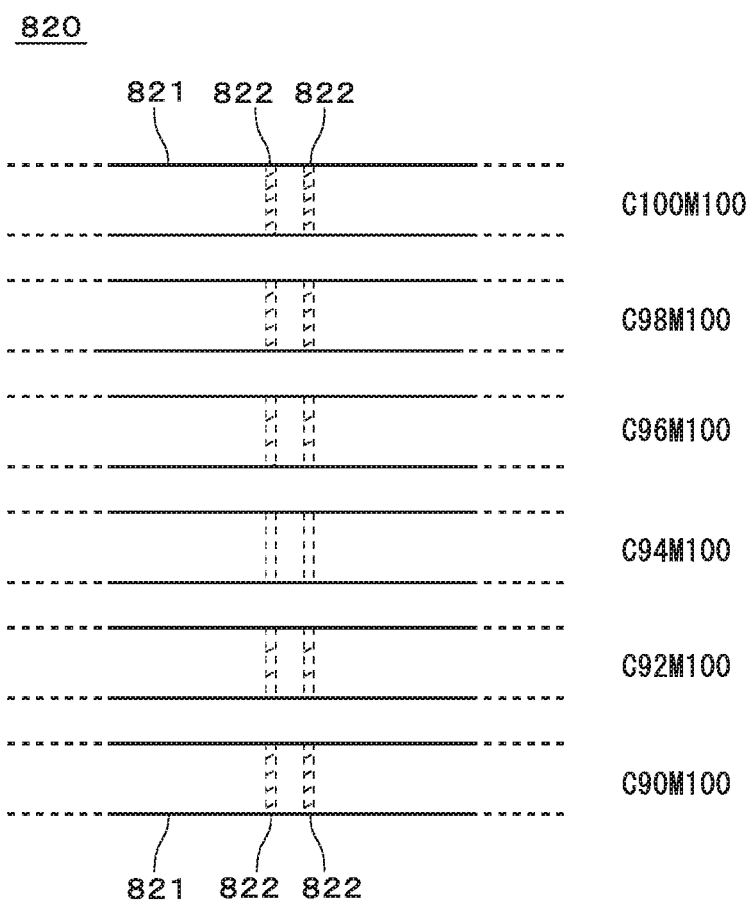
FIG. 8 is a view enlargedly showing a recording area group in one reference-value combination.

FIG. 8 is a view enlargedly showing an exemplary recording area group 820 in the reference-value combination C100M100. As shown in FIG. 2, respective end portions of ejection port rows of adjacent ejection units 32 in the width direction overlap each other in the moving direction. In FIG. 2, reference sign 320 is given to a range extending in the width direction, in which the ejection port rows of the ejection units 32 overlap each other. Hereinafter, the range 320 will be referred to as an "overlapping range".

In the exemplary case shown in FIG. 2, the ink ejection parts 31 are arranged, being deviated from one another in the width direction, so that the overlapping range 320 of cyan and the overlapping range 320 of black should coincide with each other in the width direction and the overlapping range 320 of magenta and the overlapping range 320 of yellow should coincide with each other in the width direction. Instead of deviating the ink ejection parts 31 from one another, the overlapping ranges 320 may be deviated from one another in the width direction by deviating respective use ranges of the ejection ports 321 of the ejection units 32 from one another. As a matter of course, the overlapping ranges 320 in all the ink ejection parts 31 may coincide with one another in the width direction.

The color mixing unevenness easily occurs at both width-direction ends of the overlapping range 320 of the ejection unit 32, and in FIG. 8, reference signs 822 are given to areas corresponding to the respective vicinities of both ends of the overlapping range 320 inside the recording area 821. Hereinafter, this area will be referred to as an "overlapping end area". In the overlapping range 320, some of the ejection ports 321 of one ejection unit 32 and some of the ejection ports 321 of the other ejection unit 32 are used while compensating each other. In the overlapping range 320, the usage ratio of the ejection ports 321 of one ejection unit 32 becomes higher as goes toward the side of one ejection unit 32, and the usage ratio of the ejection ports 321 of the other ejection unit 32 becomes higher as goes toward the side of the other ejection unit 32.

An area between a pair of overlapping end areas 822 in FIG. 8 corresponds to the overlapping range 320 of the ink ejection part 31. In the exemplary case shown in FIG. 8, from the upper-most recording area 821, the overlapping end area 822 sequentially becomes C100M100, C98M100, C96M100, C94M100, C92M100, and C90M100. The other area is C100M100. In more detail, positions corresponding to both ends of the overlapping range 320 are sequentially C100M100, C98M100, C96M100, C94M100, C92M100, and C90M100, but as goes farther away from the positions corresponding to both the ends toward both sides, the amount of correction from C100M100 is gradually reduced. In other words, when attention is paid to one overlapping end area 822, the above amount of correction is adopted at the center inside the overlapping end area 822 and the amount of correction is reduced as goes from the center toward both sides.

In the exemplary case shown in FIG. 8, it is specified by the operator that the color mixing unevenness becomes smallest in the two overlapping end areas 822 in C94M100. The correction value is thereby specified (Step S12). Further, in some cases, the color mixing unevenness in the left overlapping end area 822 and that in the right overlapping end area 822 become smallest in different recording areas 821. The operator inputs (−6) % as the correction value for the reference-value combination of C100M100 to the correction part 44 through the input part 406 shown in FIG. 4 (Step S13). Actually, the correction value for each overlapping end area 822 is inputted. The degree of the color mixing unevenness may be visually checked or may be checked by using the image pickup part 6. When the image pickup part 6 is used, for example, the image pickup part 6 reads the chart and the recording area 821 having the smallest sum total of differences between an average brightness value in areas other than the overlapping end area 822 and a brightness value at each position of the overlapping end area 822 in the width direction is specified as an area having the smallest unevenness.

By performing the above operation on all the reference-value combinations, a correction value for cyan which is the target color component in the case where the reference color components are cyan and magenta is determined for each overlapping end area 822. Further, by performing the above operation also on combinations of other reference color components, the correction information 441 is prepared in the correction part 44. Also in other combinations of the reference color components, the number of reference color components is two.

Figure 9:
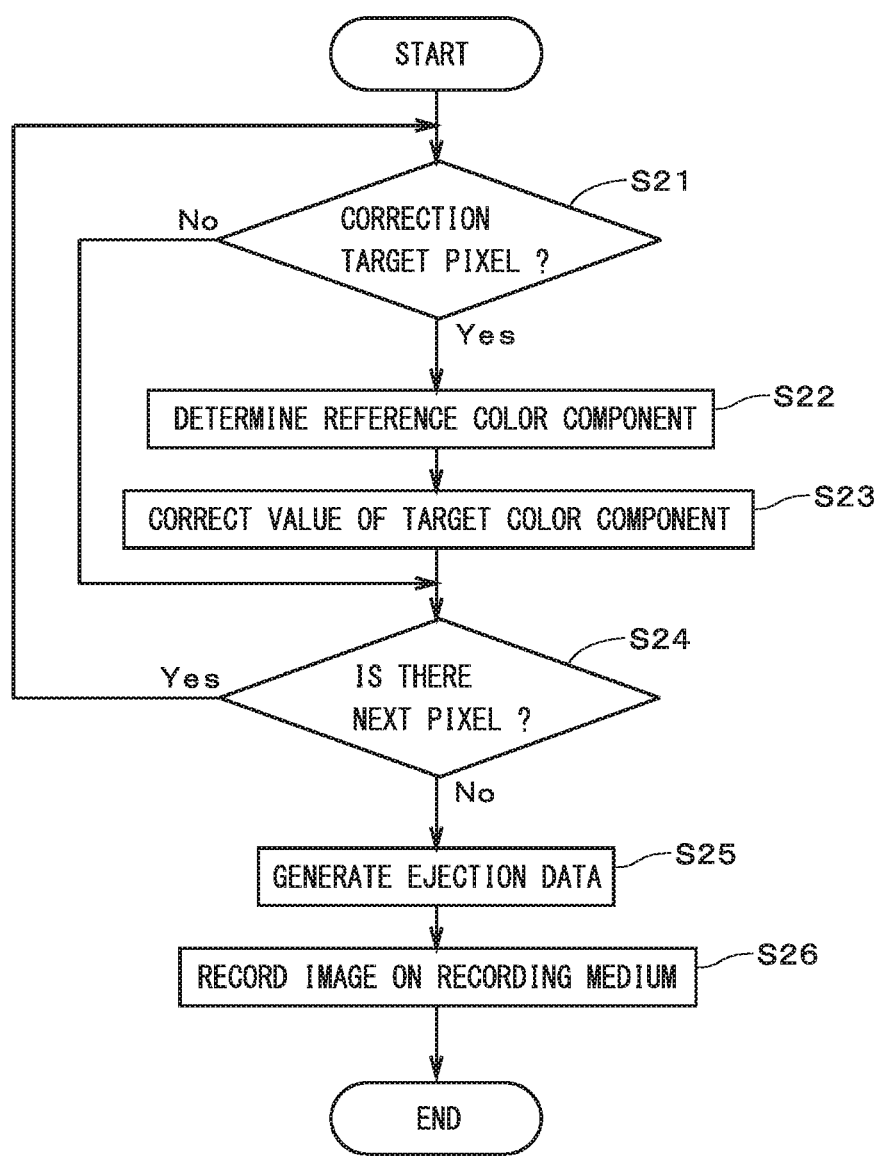
FIG. 9 is a flowchart showing an operation flow of the image recording apparatus for recording an image.

FIG. 9 is a flowchart showing an operation flow of the image recording apparatus 1 for recording an image on the recording medium 9. It is assumed that correction (shading) of the density unevenness in a single color of each color component is completed in advance. First, a position of one pixel in an image to be recorded and a value of each color component are inputted to the correction part 44, and it is checked whether the pixel is a correction target one or not (Step S21). When the pixel is not a correction target one, the process goes to the operation on the next pixel (Step S24).

In the exemplary case of the present preferred embodiment, in a case where the pixel is a pixel corresponding to the overlapping end area 822, the pixel is a correction target one. As described earlier, the overlapping range 320 is a range in the width direction, in which the ejection port rows overlap each other in the moving direction at the respective end portions of adjacent ejection units 32. The overlapping end area 822 is an area in the vicinity of each of both end portions of the overlapping range 320. Though the correction target pixel is not limited to the pixel corresponding to the overlapping end area 822, preferably, at least pixels corresponding to both ends of the overlapping range 320 are included among the correction targets.

The correction part 44 determines two reference color components on the basis of respective values of the plurality of color components of the correction target pixel (Step S22). Preferably, the correction part 44 acquires a color component(s) having a value larger than a predetermined value among respective values of the plurality of color components of the correction target pixel, and determines the two reference color components on the basis of the color component. For example, in a case where the density value consists of 96% cyan, 77% magenta, 1% yellow, and 65% black (hereinafter, represented as "C96M77Y1K65") and the predetermined threshold value is 65%, first, cyan (C), magenta (M), and black (K) are selected.

In the mapping information 442, priority is set for the combination of two reference color components in advance, and in the exemplary case of the present preferred embodiment, it is set that CM>MY>YK>CY>MK>CK. Herein, for example, "CM" represents a combination of cyan and magenta and the mark of ">" indicates that the left combination has higher priority than the right combination. A chart of all the combinations of two color components is recorded on the recording medium 9 in advance and the operator visually checks the chart, to thereby determine this priority as the order of combinations in which the color mixing unevenness occurs more easily. The intensity of the color mixing unevenness can be obtained by measurement of variation in the brightness value, or the like.

In the above exemplary case, since C, M, and K are selected, candidates of the combinations are three combinations, i.e., CM, MK, and CK. Herein, since CM>MK>CK, C96M77Y1K65 is finally mapped to CM, and cyan and magenta are determined as the combination of the reference color components.

The order of the intensity of the color mixing unevenness is not limited to the above-described example. In a case, for example, where the ink ejection order has an effect on the intensity of the color mixing unevenness and the ejection order is C, M, Y, and K, the priority of the combinations becomes CM>CY>CK>MY>MK>YK. In another case where the color component to be ejected later has more effect on the color mixing unevenness, the priority becomes YK>MK>MY>CK>CY>CM. The priority of the combinations of the reference color components is flexibly determined on the basis of the properties of ink, the type of recording medium 9, the ejection order, or the like.

In a case where there is a condition that the color mixing unevenness is inconspicuous, such as a case where respective densities of all the color components are low or where respective densities of all the color components except one color component are low, determination of the reference color component (Step S22) is not performed and the next correction (Step S23) is also not performed.

As described earlier, with respect to each combination of reference color components, one color component is determined in advance as a target color component which becomes a correction target. In a case where the two reference color components are cyan and magenta, it is preferable that the target color component should be cyan. This is because the correction of only cyan is more effective to reduce the color mixing unevenness than the correction of only magenta. In a case where the reference color components are cyan and yellow, it is preferable that the target color component should be cyan. In a case where the reference color components are magenta and yellow, it is preferable that the target color component should be magenta. Further, in a case where the two reference color components include black, it is preferable that the target color component should be black. This is because the density of black has a large effect on the color mixing unevenness. Also in a case described later where the number of reference color components is three, when the reference color components include black, it is preferable that the target color component should be black.

Further, depending on the type of ink or the type of recording medium 9, it is preferable that among the two reference color components, the color component whose droplet is ejected earlier toward the recording medium 9 should be a target color component. In a case, for example, where the droplet which reaches the recording medium 9 later has an action of drawing the droplet which reaches the recording medium 9 earlier, it is preferable that the color component whose droplet reaches the recording medium 9 earlier should be corrected. Also in a case described layer where three reference color components are determined, similarly, it is preferable that the color component whose droplet is first ejected toward the recording medium 9 should be a target color component.

Thus, the correction part 44 acquires a predetermined target color component and a correction value thereof with respect to respective values of two reference color components with reference to the correction information 441, and corrects a value of the target color component (Step S23). As described earlier, the correction of the value of the target color component (the density value in the present preferred embodiment) is equivalent to the correction of a computational pixel value of the color component.

Figure 10:
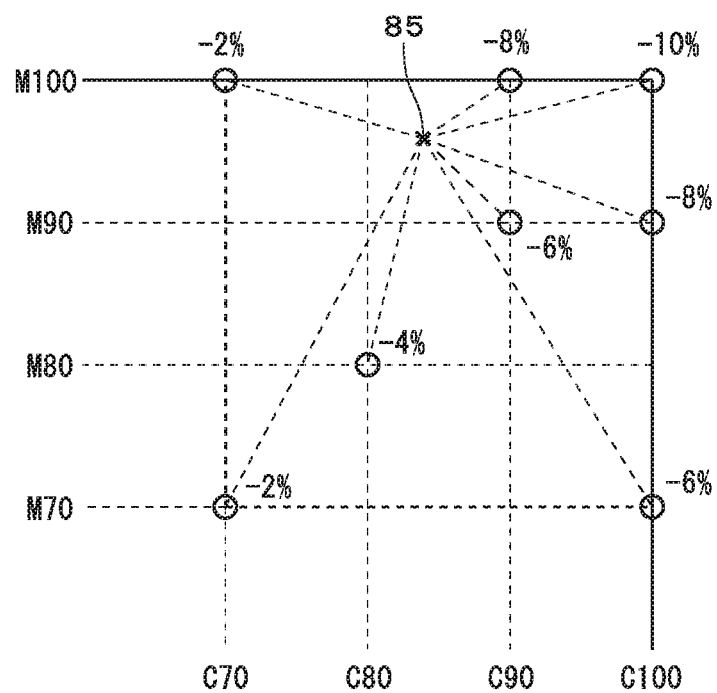
FIG. 10 is a view used for explaining an operation of acquiring a correction value.

FIG. 10 is a view used for explaining an operation of acquiring a correction value in Step S23. Like in FIG. 7, C100, C90, C80, and C70 each indicate a value of cyan and M100, M90, M80, and M70 each indicate a value of magenta at a lattice point. In a case where a value of the color component of the correction target pixel is C83M96Y1K65 and a value of cyan and a value of magenta are located at a position indicated by a point 85 (i.e., C83M96), a correction value at the point 85, i.e., a correction value of cyan which is a target color component is obtained by using the correction values at the positions of the reference-value combinations indicated by blank circles. In FIG. 10, the correction value corresponding to the reference-value combination is given near the blank circle.

As a specific example, the correction value at the point 85 is obtained by prorating the correction value by reciprocal ratio of respective distances to all the reference-value combinations. In a case, for example, where it is assumed that the distances from the point 85 to the first to eighth reference-value combinations are $L_1, L_2, \ldots, L_8$, a weighting factor $W_1$ which is a reciprocal ratio corresponding to $L_1$ is $(1/L_1)/(1/L_1+1/L_2+\ldots+1/L_8)$. Similarly, a weighting factor $W_2$ corresponding to $L_2$ is $(1/L_2)/(1/L_1+1/L_2+\ldots+1/L_8)$. When it is assumed that the correction values of the first to eighth reference-value combinations are R1, R2, ..., R8, the correction value of the target color component at the point 85 is obtained as $(R_1 \cdot W_1+R_2 \cdot W_2+\ldots+R_8 \cdot W_8)$. A reciprocal ratio of the square of distance may be used. If a correction value (−6) % for C83M96Y1K65 is obtained, for example, a value of the color component after correction is C77M96Y1K65.

In more detail, as described earlier, a correction value corresponding to the end of the overlapping range 320 is obtained by the above calculation, and a correction value for the pixel positioned away from the end of the overlapping range 320 is so modified as to decrease as goes farther away from the end of the overlapping range 320. In other words, the correction value for the correction target pixel is so modified as to decrease as goes farther away from a position corresponding to the center of the overlapping end area 822 toward both sides.

The correction values for all the reference-value combinations are not needed to be used, but for example, only correction values of the reference-value combinations in the vicinity of the point 85 may be used. A function of changing the weighting factor for the reference-value combination away therefrom by a certain distance or more to 0 may be used. Further, in a case where a point indicating the values of the reference color components of the correction target pixel is in close proximity to any one of the reference-value combinations, the correction value of the reference-value combination may be adopted as the correction value of the target color component of the pixel. Thus, the correction value of the target color component may be obtained by various methods using the correction values of the reference-value combinations.

After Steps S21 to S23 are executed on one pixel, Steps S21 to S23 are executed on the next pixel (Step S24). Specifically, it is checked whether the pixel is a correction target pixel or not (Step S21), and when the pixel is a correction target, the combination of the reference color components is determined if possible (Step S22), and when the reference color components have been determined, the correction of the target color component is performed (Step S23). By performing Steps S21 to S23 on all the pixels, the correction of the image is completed (Step S24).

After the correction is completed, the output control part 41 generates ejection data which are control data for ejecting droplets of ink from the ejection ports of the head part 3 on the basis of the corrected image data (Step S25). By controlling the head part 3 and the moving mechanism 2 in accordance with the ejection data, an image in which the color mixing unevenness is reduced is recorded on the recording medium 9 (Step S26).

Though the number of color components of the ink ejected from the head part 3 is four in the above-described preferred embodiment, the number of color components may be two or three, or may be five or more. Preferably, the number of color components is four or more. In a two-color printer for performing image recording using only cyan and black, for example, the color mixing unevenness may be reduced by correcting only black. Further, in a multicolor printer using five or more colors including special colors, such as orange, green, violet, or the like, one target color component may be corrected. When the number of color components used for the image recording is three or more, there may be a case where two reference color components are determined for each pixel and one target color component is corrected, or there may be another case where three reference color components are determined and one or two target color components are corrected.

In a case where the number of reference color components is two and the number of target color components is one, with respect to each of the reference-value combinations of the two reference color components, the chart 82 includes a plurality of recording areas 821 in which a value of the target color component is slightly changed within a predetermined range in the width direction. Further, "being slightly changed" means that the interval of the values in the change is sufficiently smaller than the interval of the values of the reference-value combinations, and preferably, the interval of the values in the change is smaller than one third of the interval of the values of the reference-value combinations, more preferably smaller than one fifth thereof, and the lower limit value is a minimum unit.

In a case where the number of reference color components is three and the number of target color components is one, the chart 82 includes a plurality of recording area 821 in which a value of the target color component is slightly changed within a predetermined range in the width direction, with respect to each of the reference-value combinations of three reference color components (specifically, a plurality of combinations of three values). In a case where the number of reference color components is three and the number of target color components is two, the chart 82 includes a plurality of recording area 821 in which respective values of the target color components are slightly changed in various ways within a predetermined range in the width direction, with respect to each of the reference-value combinations of three reference color components.

Generally describing, by the control of the output control part 41, a chart is recorded on the recording medium and the chart includes a plurality of recording area in which a value of at least one target color component is slightly changed in a plurality of ways within a predetermined range in the width direction, with respect to each of a plurality of value combinations of a plurality of reference color components. Then, in Step S13, with reference to the chart, determined is a relation between respective values of the plurality of reference color components and a correction value of at least one target color component in (the almost center of) each overlapping end area 822.

In a case where the number of reference color components is two, on the basis of respective values of two reference color components among a plurality of color components of the correction target pixel, the correction part 44 corrects a value of one target color component which is included among the two reference color components and determined in advance for the two reference color components. In a case where the number of reference color components is three, on the basis of respective values of three reference color components among a plurality of color components of the correction target pixel, the correction part 44 corrects a value of one target color component or respective values of two target color components which are included among the three reference color components and determined in advance for the three reference color components.

Though two reference color components are determined on the basis of the color component(s) having a value larger than a predetermined threshold value in the above-described description, also in the case where the number of reference color components is three, the reference color components may be determined on the basis of the color component(s) having a value larger than the predetermined threshold value. The threshold value may be changed for each color component. Since the reference color components are determined in accordance with the color component(s) having high density, it is possible to effectively reduce the color mixing unevenness. Generally describing, the correction part 44 determines two reference color components or three reference color components on the basis of respective values of a plurality of color components of the correction target pixel.

Thus, in the image recording apparatus 1, in order to suppress the color mixing unevenness, correction of only one color component or two color components is performed. Such a technical feature is based on finding of the fact that it is possible to sufficiently reduce the color mixing unevenness even if correction is not performed on all the three or more color components. Further, only with correction of one color component, the color mixing unevenness can be sufficiently suppressed. As a result, it is possible to easily acquire information required for correction. For example, it is possible to largely reduce the amount of charts required to acquire the correction information 441 and it is also possible to reduce the number of processes for acquiring the correction information 441, loss of ink, cost for waste paper or the like, time, environmental load, or the like.

In a case where the number of reference color components is two, the number of target color components is one, and the number of reference-value combinations of two colors is eight, the number of charts is 8 ($=_2C_2 \times 8$) when the number of all color components is two, the number of charts is 24 ($=_3C_2 \times 8$) when the number of all color components is three, and the number of charts is 48 ($=_4C_2 \times 8$) when the number of all color components is four. In contrast to this, in the method disclosed in Japanese Patent Application Laid-Open No. 2012-6386, for example, the number of charts largely increases as the number of color components increases, and particularly, when the number of color components is four or more, there is a possibility that this method is not suitable for practical use.

Further, in the image recording apparatus 1, the amount of correction information 441 is less and the amount of computation required for correction is also less. For this reason, it is possible to easily correct the color mixing unevenness which occurs when a plurality of color components overlap one another.

In the above-described image recording apparatus 1, various modifications can be made.

The ink ejection part 31 may be provided with one ejection unit including a plurality of ejection ports arranged across a recording range on the recording medium 9 in the width direction, instead of the plurality of ejection units 32.

The recording medium 9 may be paper or a film, or may be a sheet-like other material. Only if the recording medium 9 has a recording target face, the recording medium 9 is not limited to a sheet-like one. As compared with paper, a resin film has a great effect of reducing the color mixing unevenness. Various types of ink may be used and ink may be water-based or UV curable one. Further, in a case of UV curable ink, the color mixing unevenness can be more effectively reduced.

Though the target color component of the pixel corresponding to the overlapping end area 822 is corrected in the above-described preferred embodiment, correction may be performed on a pixel corresponding to a range other than the overlapping end area 822. Only if the range is a predetermined range in the width direction, correction for suppressing the color mixing unevenness may be performed in various ranges. The above correction may be applied to the image recording apparatus 1 which includes no overlapping range 320.

In the chart 82, the recording area 821 has only to be present in a range on the recording medium 9, in which the color mixing unevenness occurs, and is not necessarily needed to be present across the entire width direction of the recording range.

The reference color component may be determined with reference to some information other than the mapping information. For example, priority for each color component is determined and priority of the combination of the color components may be determined on the basis of the priority for each color component. Further, the priority of the combination of the color components may be changed in accordance with the type of recording medium 9.

Though the reference color components and the target color component are determined on a pixel basis in the above-described preferred embodiment, the reference color components and the target color component of the correction target pixel included in an image or an area in the image may be determined on an image basis or on an area basis. The determination of the reference color components and the target color component may be performed for all the correction target pixels in advance.

In the image recording apparatus 1, the image pickup part 6 may be omitted. The check of the color mixing unevenness in the chart 82 may be performed by the operator through visual check, or by a measuring device provided outside the apparatus.

The image recording apparatus 1 may be a cut sheet printer which sequentially records an image on a plurality of recording media. In the image recording apparatus 1, only if the recording medium 9 is moved relative to the head part 3 in the Y direction which is the moving direction, for example, the head part 3 may be moved by the moving mechanism 2 in the Y direction over the recording medium 9 which is not moved.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Image recording apparatus
2 Moving mechanism
3 Head part
9 Recording medium
41 Output control part
44 Correction part
31 Ink ejection part
32 Ejection unit
82 Chart
320 Overlapping range
321 Ejection port
821 Recording area
822 Overlapping end area
S11 to S13, S21 to S26 Step

The invention claimed is:

1. An image recording apparatus for recording an image on a recording medium, comprising:
 a head part for ejecting droplets of ink toward a recording medium;
 a moving mechanism for moving said recording medium relative to said head part in a moving direction;
 an output control part for controlling ejection of ink from said head part in synchronization with relative movement of said recording medium; and
 a correction part for correcting values of a color component of at least some of pixels included in said image, wherein
 said head part includes a plurality of ink ejection parts for ejecting droplets of inks having color components different from one another and said plurality of ink ejection parts are arranged in said moving direction, each ink ejection part includes a plurality of ejection ports arranged across a recording range on said recording medium with respect to a width direction perpendicular to said moving direction, said recording medium passes through said head part only once when an image is recorded on said recording medium, and said correction part corrects a value of only one target color component of only two reference color components among a plurality of color components of a correction target pixel on the basis of respective values of said two reference color components, or corrects a value of only one target color component or respective values of only two target color components of only three reference color components among said plurality of color components on the basis of respective values of said three reference color components.

2. The image recording apparatus according to claim 1, wherein said correction part determines said two reference color components or said three reference color components on the basis of respective values of said plurality of color components of said correction target pixel.

3. The image recording apparatus according to claim 2, wherein said correction part acquires a color component having a value larger than a predetermined value out of said respective values of said plurality of color components of said correction target pixel and determines said two reference color components or said three reference color components on the basis of said acquired color component.

4. The image recording apparatus according to claim 2, wherein said correction part determines said two reference color components from said respective values of said plurality of color components of said correction target pixel, said two reference color components are cyan and magenta, and said target color component is cyan.

5. The image recording apparatus according to claim 2, wherein said two reference color components or said three reference color components include black and black is a target color component.

6. The image recording apparatus according to claim 2, wherein a color component whose droplet is first ejected toward said recording medium, among said two reference color components or said three reference color components, is said target color component.

7. The image recording apparatus according to claim 1, wherein the number of said plurality of color components is four or more.

8. The image recording apparatus according to claim 1, wherein a chart is recorded on a recording medium by the control of said output control part, said chart including a plurality of recording areas in which a value of at least one target color component is slightly changed in a plurality of ways within a predetermined range in a width direction, with respect to each of a plurality of value combinations of a plurality of reference color components.

9. The image recording apparatus according to claim 1, wherein said each ink ejection part includes a plurality of ejection units arranged in said width direction, respective end portions of ejection port rows of adjacent ejection units in said width direction overlap each other in said moving direction, and pixels corresponding to both ends of a range in said width direction, said range in which said ejection port rows overlap each other, are included among targets of correction to be performed by said correction part.

10. An image recording method of recording an image on a recording medium, comprising:

a) correcting values of a color component of at least some of pixels included in an image; and b) recording said image on said recording medium by moving said recording medium relative to a head part in a moving direction while ejecting droplets of ink toward said recording medium from said head part on the basis of said image, wherein said head part includes a plurality of ink ejection parts for ejecting droplets of inks having color components different from one another and said plurality of ink ejection parts are arranged in said moving direction, each ink ejection part includes a plurality of ejection ports arranged across a recording range on said recording medium with respect to a width direction perpendicular to said moving direction, said recording medium passes through said head part only once when an image is recorded on said recording medium, and a value of only one target color component of only two reference color components among a plurality of color components of a correction target pixel is corrected on the basis of respective values of said two reference color components or a value of only one target color component or respective values of only two target color components of only three reference color components among said plurality of color components are corrected on the basis of respective values of said three reference color components in said operation a).

11. The image recording method according to claim 10, further comprising:

before said operation a), c) recording a chart on a recording medium by using said head part, said chart including a plurality of recording areas in which a value of at least one target color component is slightly changed in a plurality of ways within a predetermined range in a width direction, with respect to each of a plurality of value combinations of a plurality of reference color components; and d) determining a relation between respective values of said plurality of reference color components and a correction value of said at least one target color component with reference to said chart.

12. A correction information acquisition method of acquiring correction information which is referred to in an operation a) in an image recording method described below, said image recording method comprising:

a) correcting values of a color component of at least some of pixels included in an image; and b) recording said image on a recording medium by moving said recording medium relative to a head part in a moving direction while ejecting droplets of ink toward said recording medium from said head part on the basis of said image, wherein said head part includes a plurality of ink ejection parts for ejecting droplets of inks having color components different from one another and said plurality of ink ejection parts are arranged in said moving direction, each ink ejection part includes a plurality of ejection ports arranged across a recording range on said recording medium with respect to a width direction perpendicular to said moving direction, said recording medium passes through said head part only once when said image is recorded on said recording medium, and a value of only one target color component of only two reference color components among a plurality of color components of a correction target pixel is corrected on the basis of respective values of said two reference color components or a value of only one target color component or respective values of only two target color components of only three reference color components among said plurality of color components are corrected on the basis of respective values of said three reference color components in said operation a), said correction information acquisition method comprising:

c) recording a chart on a recording medium by using said head part, said chart including a plurality of recording areas in which a value of at least one target color component is slightly changed in a plurality of ways within a predetermined range in a width direction, with respect to each of a plurality of value combinations of a plurality of reference color components; and d) determining correction information indicating a relation between respective values of said plurality of reference color components and a correction value of said at least one target color component with reference to said chart.

* * * * *